United States Patent
Holzleitner et al.

(10) Patent No.: US 9,823,906 B2
(45) Date of Patent: Nov. 21, 2017

(54) COMPLEMENTARY MODEL-DRIVEN AND TEXTUAL DEVELOPMENT USING ENFORCED FORMATTING CONSTRAINTS

(71) Applicant: SAP SE, Walldorf (DE)

(72) Inventors: Manuel Holzleitner, Karlsruhe (DE); Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/087,600

(22) Filed: Mar. 31, 2016

(65) Prior Publication Data
US 2017/0286070 A1    Oct. 5, 2017

(51) Int. Cl.
G06F 9/44    (2006.01)
G06F 17/21   (2006.01)
G06F 17/24   (2006.01)
G06F 9/445   (2006.01)
G06F 9/45    (2006.01)

(52) U.S. Cl.
CPC .............. *G06F 8/35* (2013.01); *G06F 8/4443* (2013.01); *G06F 8/65* (2013.01); *G06F 17/212* (2013.01); *G06F 17/24* (2013.01)

(58) Field of Classification Search
None
See application file for complete search history.

(56) References Cited

U.S. PATENT DOCUMENTS

| | | | |
|---|---|---|---|
| 8,543,653 B2 | 9/2013 | Bhatt et al. | |
| 8,655,989 B2 | 2/2014 | Ritter et al. | |
| 8,661,107 B2 | 2/2014 | Oliver Hoffmann et al. | |
| 8,739,124 B2 | 5/2014 | Ritter et al. | |
| 8,805,769 B2 | 8/2014 | Ritter et al. | |
| 8,850,005 B2 | 9/2014 | Bhatt et al. | |
| 9,135,604 B2 | 9/2015 | Ritter et al. | |
| 9,342,276 B1* | 5/2016 | Lin | G06F 8/34 |
| 2008/0155397 A1* | 6/2008 | Bissonnette | G06F 17/212 715/256 |
| 2011/0119605 A1* | 5/2011 | Jayadevan | G06F 8/38 715/763 |
| 2012/0089960 A1* | 4/2012 | Medvidovic | G06F 8/71 717/105 |
| 2013/0205275 A1* | 8/2013 | Thomson | G06F 8/34 717/105 |
| 2014/0068635 A1 | 3/2014 | Holzleitner et al. | |
| 2014/0282131 A1* | 9/2014 | Castro | G06F 8/34 715/763 |
| 2017/0123762 A1* | 5/2017 | Drukman | G06F 8/34 |

OTHER PUBLICATIONS

Internet article "8 Types of Excel Charts &When You Shoud Use Them", Ryan Dube, Aug. 10, 2015.*

* cited by examiner

*Primary Examiner* — Daxin Wu
(74) *Attorney, Agent, or Firm* — Fish & Richardson P.C.

(57) ABSTRACT

A complementary editor opens a plurality of views. Changes are received in a particular view of the plurality of views. The received changes are propagated to other views of the plurality of views other than the particular view and received by each particular view. The propagated changes are transformed in each particular view by a computer based on formatting constraints associated with each particular view and display of the transformed propagated changes is initiated in each particular view.

17 Claims, 16 Drawing Sheets

COMPLEMENTARY MODEL-DRIVEN AND TEXTUAL DEVELOPMENT USING ENFORCED FORMATTING CONSTRAINTS

BACKGROUND

Through digital transformations, games, wearables, cyber-physical, and Internet of Things (IoT) devices are evolving and growing fields of programmable software and hardware units integrated into human's everyday lives. These units are currently programmed in a disconnected and abstract fashion in conventional software editors. The current state of the art of programming is inherently either dominated by a "textual" (for example, source code) or "model-driven" (for example, external domain specific language (DSL)) abstraction level, which hides views of crucial aspects (for example, a model or text and instant feedback through an executing runtime). In particular, the lack of instant feedback through runtime leads to inefficient software or hardware integration.

SUMMARY

The present disclosure describes methods and systems, including computer-implemented methods, computer program products, and computer systems for complementary model-driven and textual development using enforced formatting constraints.

In an implementation, a complementary editor opens a plurality of views. Changes are received in a particular view of the plurality of views. The received changes are propagated to other views of the plurality of views other than the particular view and received by each particular view. The propagated changes are transformed in each particular view by a computer based on formatting constraints associated with each particular view and display of the transformed propagated changes is initiated in each particular view.

Particular implementations of described methods and systems can include corresponding computer systems, apparatuses, or computer programs (or a combination of computer systems, apparatuses, and computer program) recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described subject matter provides a modelling and development environment that is flexible and can be adapted to be used in various and multiple domains. Second, the described subject matter provides an efficient workflow that reduces feedback cycle and improves development process significantly compared to existing approaches. Efficient workflow is achieved through a life artifact execution (reactive) and an immediate propagation to all views (actual). Execution of code/model is permitted and backpropagation of arbitrarily complex runtime information to other views occurs. Code/model changes in the runtime propagate to other views. The described method is designed to run in a central, easy accessible place (for example, the Internet or other network) for instant readiness/use. From a domain point of view, syntactical and semantical services are completely within the definition of the described method. Combinations with existing tools and concepts are possible and allow for continuity when starting use from legacy code bases. Constraint enforcement and bi-directional mappings reduce complexities of underlying software development domains. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
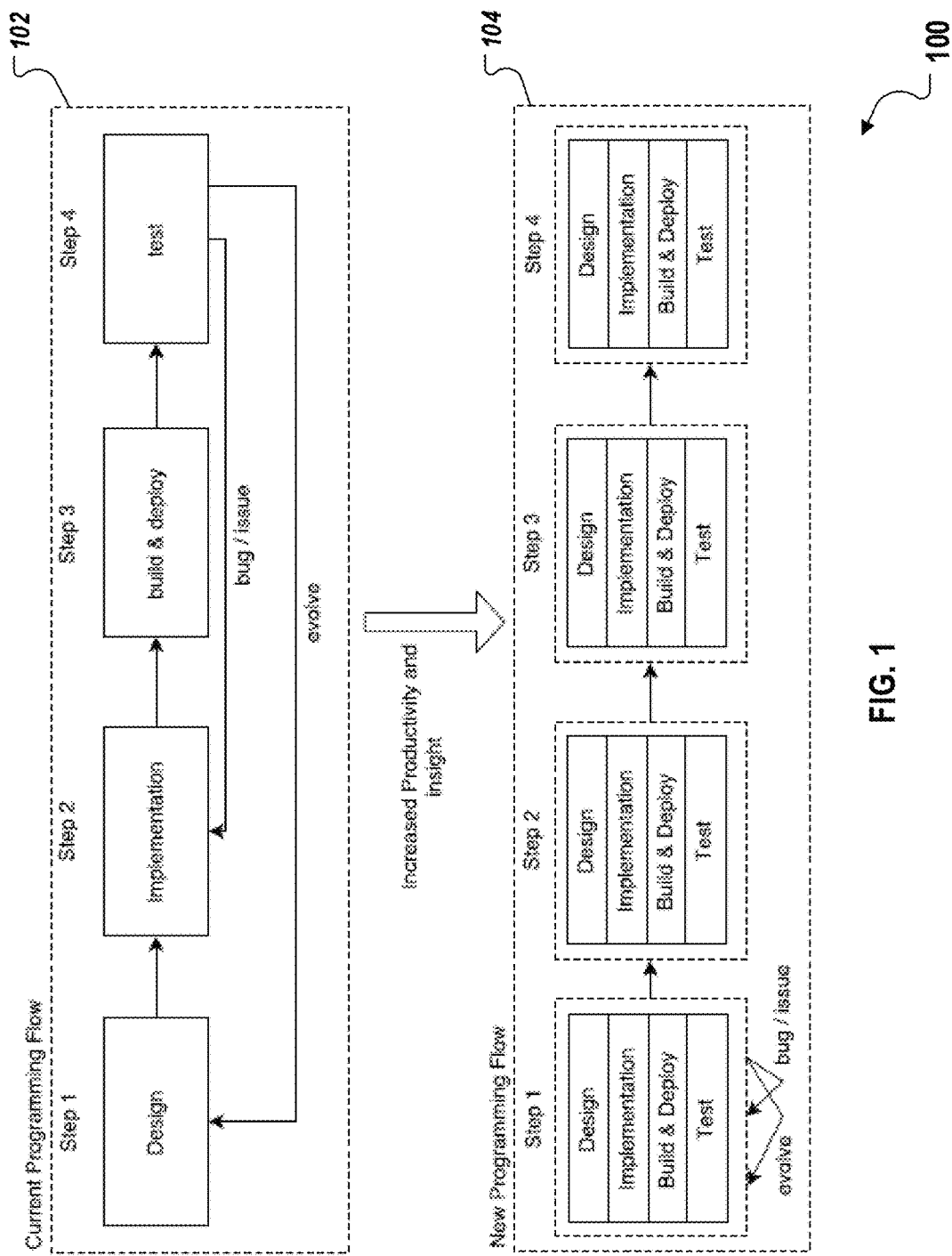
FIG. 1 illustrates conventional and complementary programming flows, according to an implementation, according to an implementation.

The following detailed description describes complementary model-driven and textual development using enforced formatting constraints and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Conventional programming and tools are not simultaneously flexible, usable, actual, and reactive. Therefore, development cycles and their toolchains are long-running and intricate. For example, some editors do not support to work with several computing languages and their embedding within each other (that is, a lack of flexibility). All editors support programming models of long intra-development cycles (that is, a lack of efficiency). In conventional editors, model-driven and textual programming are disconnected by having all information in one place (that is, a lack of reactiveness). Conventional editors do not have instant feedback, for example, from an executing runtime or compiler (that is, a lack of actuality). Further, most programming editors are local applications and not usable without installation procedures on a computing device. As a result, these programming editors do not support auto-layouts and formatting of model and source code as top level concepts (that is, a lack of usability).

The described approach uses a "complementary editor" that comprehensively ensures flexibility, efficiency, reactiveness, actuality, and usability, which allows for efficient software development even in complex domains. Efficient workflow is achieved through a life artifact execution (reactive) and an immediate propagation to all views (actual). Execution of code/model is permitted and backpropagation of arbitrarily complex runtime information to other views occurs. Code/model changes in the runtime propagate to other views.

The described approach consists of a conceptual editor definition that is flexible (that is, embedded multi-grammar and language editing), usable, actual (for example, changing the runtime or its model leads to changes to the textual and graphical model) and reactive, which combines the benefits of integrated development environments with language workbenches. Complex systems can be implemented and (continuously) delivered using the same editor. For instance, development of an integration language, for which the icon notation, the configuration and the messaging constructs are developed and deployed from the editor, in which the icons are designed.

The editor is defined to be extendable (for example, using a plugin or other mechanism), adaptable (for example, grammars and meta-models can be changed at runtime and new grammars and meta models can be created ad-hoc) and supporting collaboration functionality (for example, multiple users can work on one model at the same time), timely (for example, capturing input and replaying it on another runtime) and supporting large amounts of data (for example, large models, code bases, configurations, and the like).

The definition of an information complete semantic model (textual and model) and an event mechanism, which allows all parts of the concept to be kept up-to-date.

The specification of pair-wise, bi-directional transformation constraints for the automatic synchronization. The semantic model is programmable from both directions for textual and model views (that is, in addition, changing the model leads to source code changes, thus to immediate compilation and runtime log updates). The bi-directional transformation can be based on textual constraints and model constraints. The textual constraints may include ordering (for example, based on dependency, analysis), chosen ambiguities (for example, syntactical precedence), and whitespaces (for example, pretty printer configuration, enforcement of code and style conventions). The model constraints may include xy-positioning (for example, layouts and algorithms) and width-height of shapes (for example, layouts).

The definition of pretty printer constraints (language) and a pretty printer generator. Code and model changes lead to ad-hoc auto-formatting, according to the language's formatting and modeling guidelines. The editor is available from any lifecycle aspect view (for example, text, model, etc.) and supports all necessary views to complete a complex task (for example, changing the grammar of a language, while programming).

FIG. 1 illustrates conventional and complementary programming flows 100, according to an implementation. A conventional programming flow 102 is usually supported by integrated development environments (IDEs) that specialized on one of the two abstraction levels, which implies "hiding" information such as views on crucial aspects like a model or text and instant feedback through an executing runtime. The code is either generated (model-driven) and "glue-coded" to the actual code or simply coded ("code disconnect"), while models remain abstract code ("model disconnect"). In the conventional programming flow 102 the actual behavior is hidden beneath an a code or model abstraction, which requires long-running tool chains from step 1 of designing/modeling, step 2 of implementing/generating and gluing, step 3 of building and deploying, and step 4 of testing code. The "late" feedback is then used to change step 1 or step 2 and to re-iterate (runtime disconnected). Therefore, the real behavior lies behind a toolchain causing no instant feedback. In contrast, a new complementary programming flow 104 provides increased productivity and insight by integrating steps of design, implementation, build/deploy and test at each stage, merging time-consuming single steps and related interactions into one combined step to enable instant feedback by features such as reactiveness, actuality, etc. For the purposes of this disclosure, the new complementary programming is called flexible, usable, reactive programming (Flurp).

Figure 2:
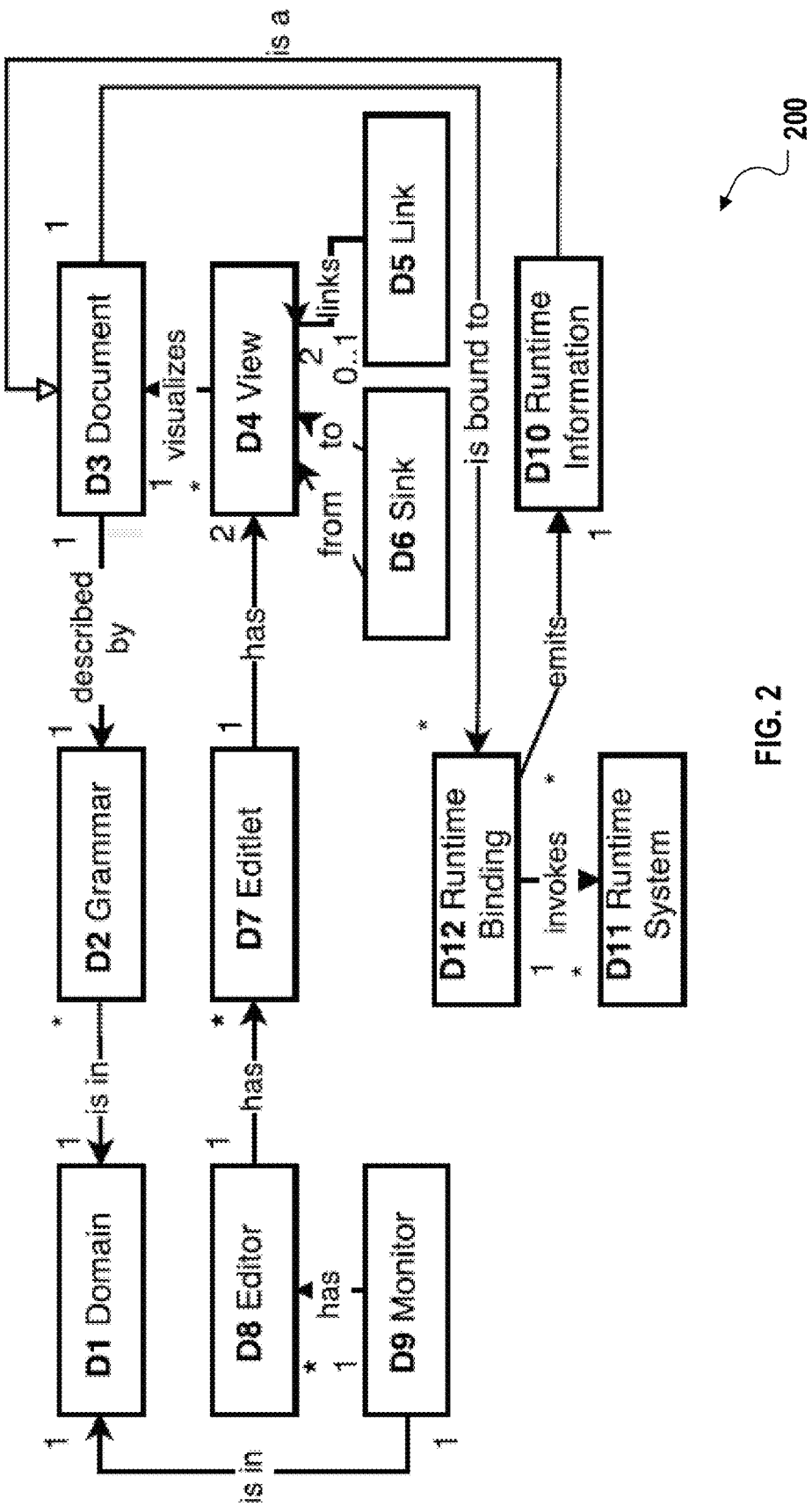
FIG. 2 illustrates definitions and relationships for a complementary programming, according to an implementation.

FIG. 2 illustrates definitions and relationships 200 for a complementary editor, according to an implementation. Definitions and relationships 200 include:

Domain (D1): general context (for example, message integration, database queries).

Grammar (D2): structured definition of information (for example, Extended Backus-Naur Form (EBNF)) for a domain.

Document (D3): piece of information in a special format (for example, grammar, meta-model, etc.).

View (D4): can be textual or visual representation of a modifiable document.

Link (D5): bi-directional change event mechanism that synchronizes two views (in contrast, a single directional change event is called sink D6).

Editlet (D7): two or more linked or sinked views. Editlet is connected, if and only if, there is at least one view in each editlet, which is pairwise linked or sinked to at least one view' in another editlet. One view exists only in one editlet.

Editor (D8): a set of one or more connected editlets.

Monitor (D9): is a composition of several editors of one domain (not necessarily in the same OS GUI window; for example, tiled windows).

Runtime Information (D10): a runtime information document (for example runtime model, runtime log). Runtime state information expressed.

Runtime System (D11): implementation of a concept domain.

Runtime Binding (D12): invokes one or more runtime systems and collects log and runtime information.

Figures 3A, 3B:
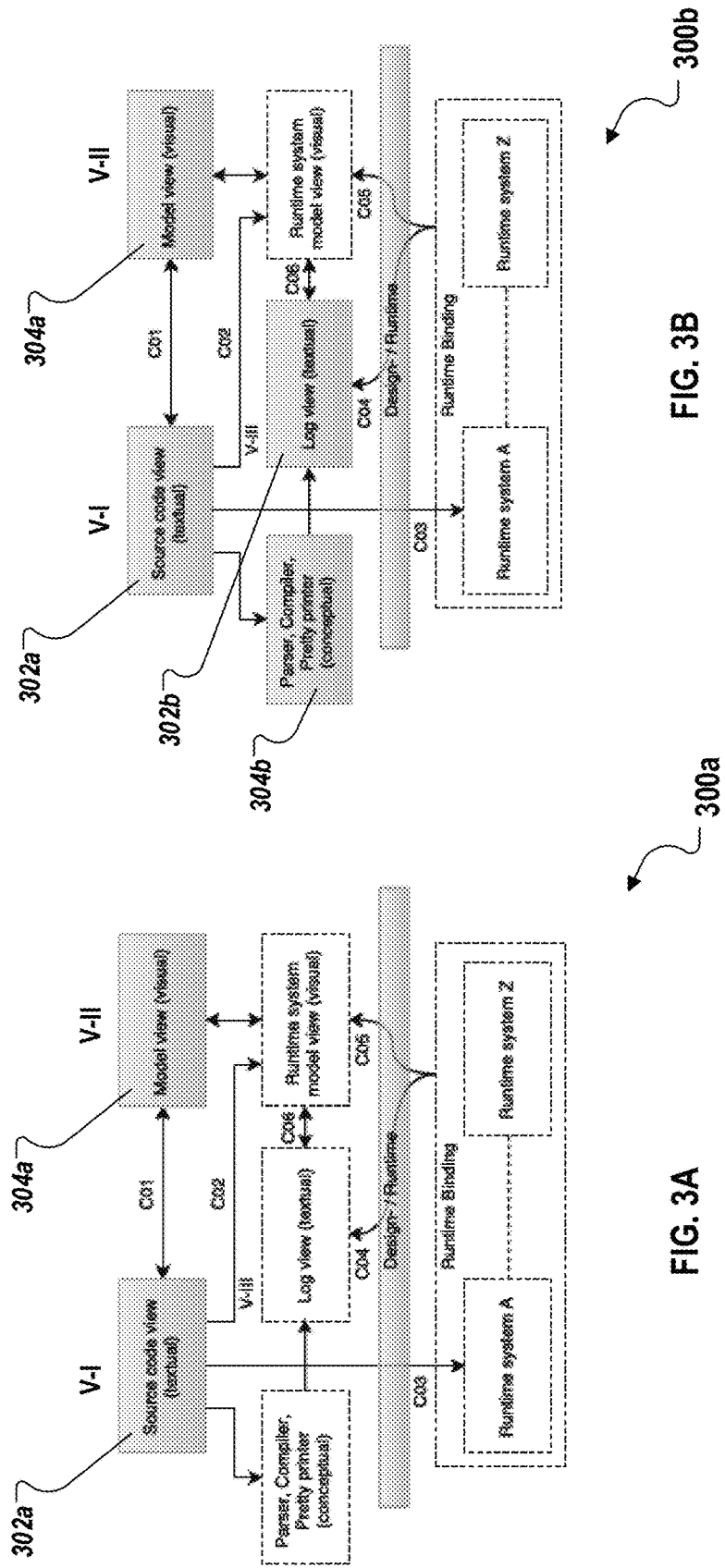
FIG. 3A is a block diagram of a flexible, usable, reactive programming (Flurp) minimal editlet, according to an implementation
FIG. 3B is a block diagram of a monitor, according to an implementation.

FIG. 3A is a block diagram of a Flurp-minimal editlet 300a, according to an implementation. The Flurp-minimal editlet 300a includes a source code document view (textual) V-I 302a linked to its model document view (visual) V-II 304a, which means that changes in either component are instantly propagated and presented in the other component and vice-versa (C01). 302a can be a classical textual source code editor with additional textual editing support features like syntax highlighting, automatic code refactorings, etc. 304a is a model view that presents the information which is also in 302b in a visual way (graphs, diagrams) and for example, allows editing using adding/removing additional nodes/edges (for example, see FIG. 6 right side, for a model view example). In some implementations, a textual markup editor with a visual rich text editor can be an example for a Flurp-minimal editlet 300a.

FIG. 3B is a block diagram of a monitor 300b, according to an implementation. The monitor 300b includes an editlet (for example, a source code view and model view as shown in FIG. 3A), a log view 302b, and a parser, complier, and pretty printer 304b. This means that extending the concept described in FIG. 3A, a change to one of the components described in FIG. 3A is also instantly propagated to the parser, compiler, and pretty printer (conceptual) 304b which parses, compiles the code or model, and outputs compiler, parsing information (compile logs) to the log view 302b that presents this information to the user visually and/or textually. A pretty printer may also update the source code view with optimized, formatted code and thus enforces formatting constraints on the textual representation of the model.

Figure 3C:
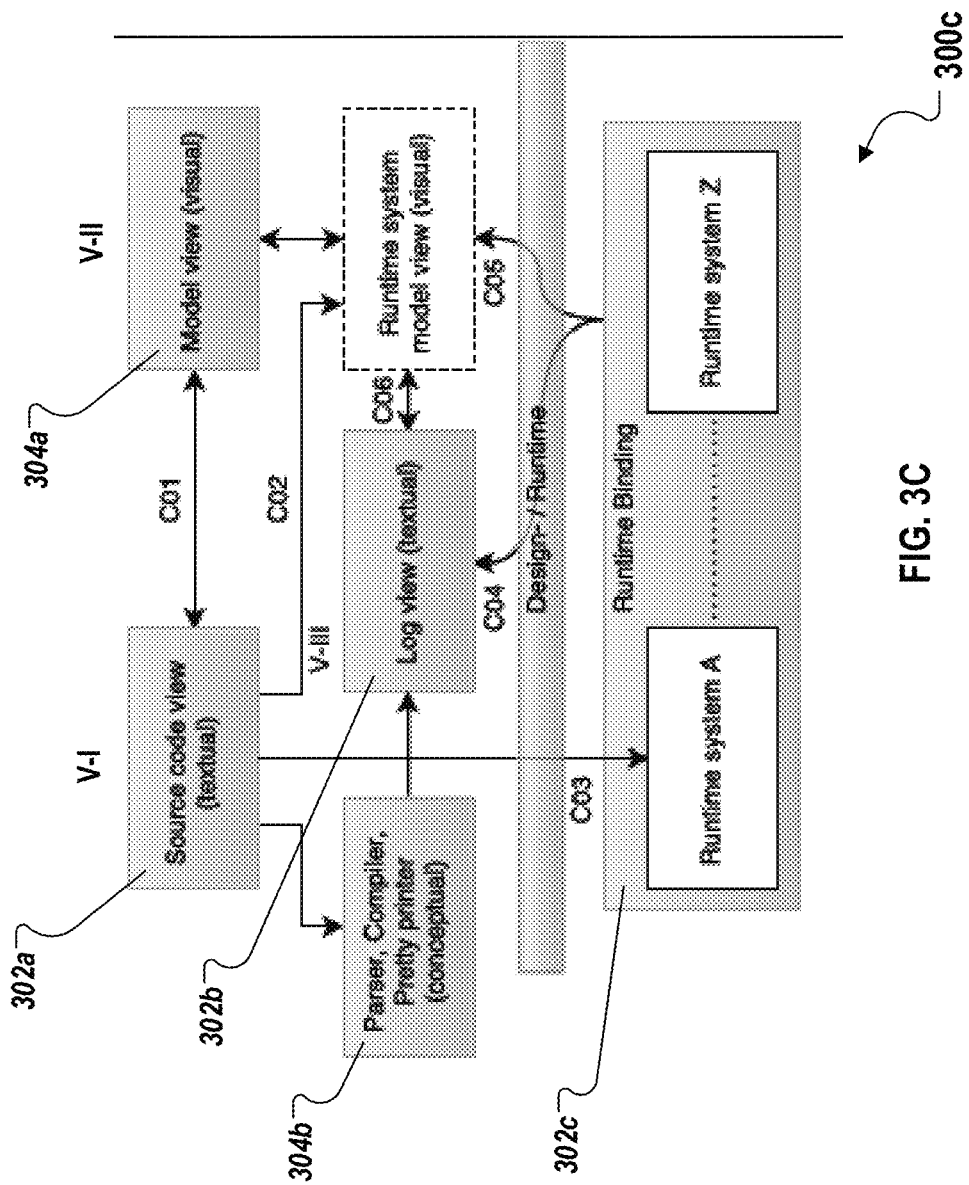
FIG. 3C is a block diagram of an actual monitor, according to an implementation.

FIG. 3C is a block diagram of an actual monitor 300c, according to an implementation. The actual monitor 300c includes a monitor (for example, a source code view 302a, model view 304a, log view 302b, and parser, complier, and pretty printer 304b as shown in FIG. 3B) and extending the concept described in FIG. 3B, a runtime binding 302c. In some implementations, the runtime binding 302c invokes one or more runtime systems and collects log and runtime information (C04), that are propagated to a runtime log V-III while it executes or interprets the code or binaries (after compilation) propagated from the source code view (C03).

Figure 4:
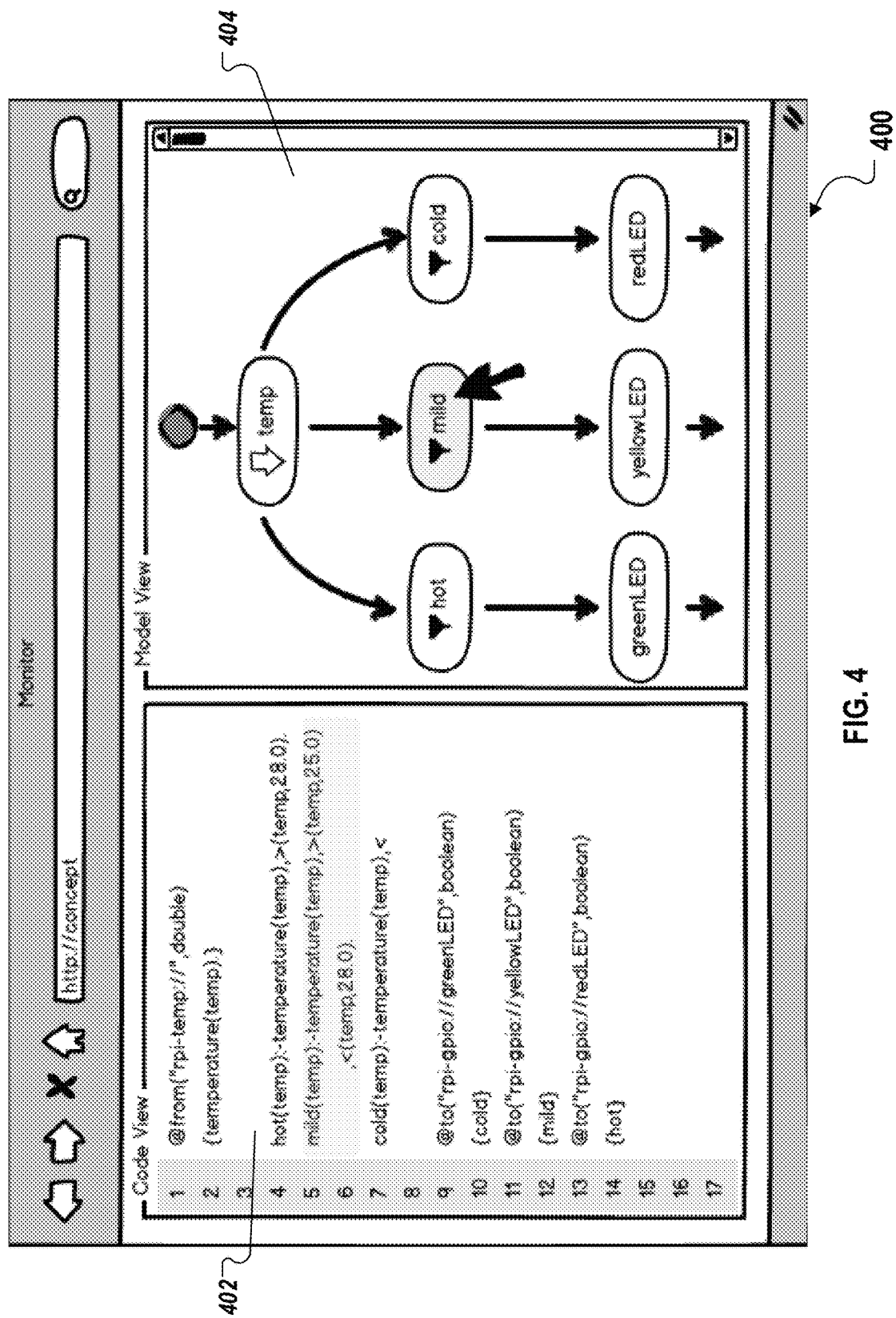
FIG. 4 illustrates an example Flurp-minimal editlet, according to an implementation.

FIG. 4 illustrates an example Flurp-minimal editlet 400, according to an implementation. The left-hand side of the Flurp-minimal editlet 400 is a code view 402 showing integration language code, while the right-hand side denotes a model view 404 showing the corresponding graphical model. Changes in the graphical model lead to changes in the code and vice versa. In some implementations, a mouse-over on a model or code highlights its counterpart. For example, as illustrated in FIG. 4, the mouse-over on "mild" in the model view 404 highlights the corresponding code in the code view 402.

Figure 5:
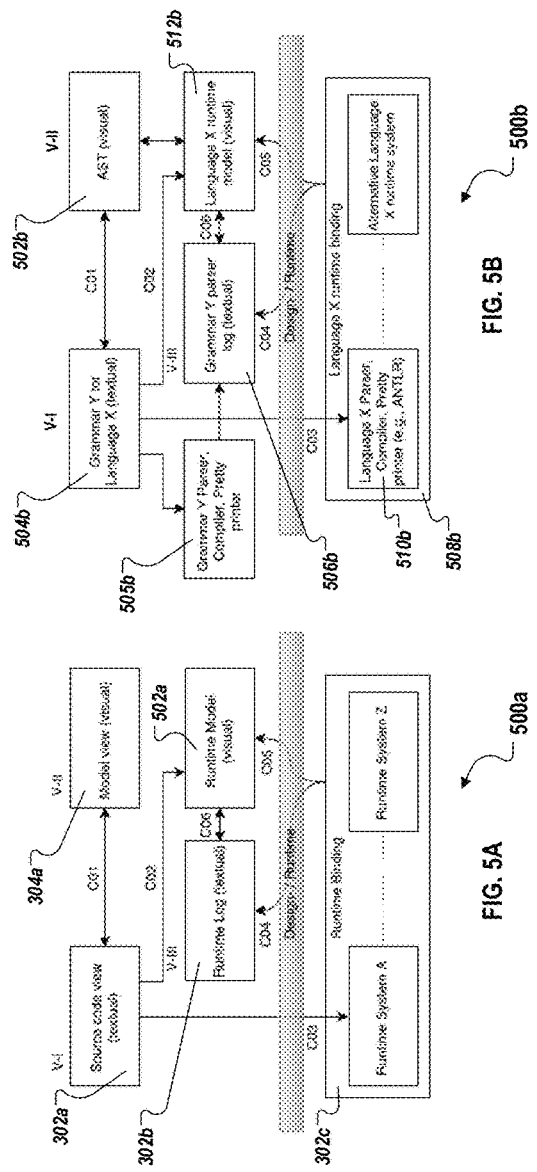
FIG. 5A is a block diagram of a conceptual complementary editor.
FIG. 5B is a block diagram of an example complementary editor used for language workbench.

FIG. 5A is a block diagram of a conceptual complementary editor which extends the mechanism described in FIG. 3C with a visual Runtime Model (visual) 502a, whereas the runtime binding 302c also propagates events and runtime information to a complete runtime model (C05). The runtime log (textual) 302b is linked to the runtime model (visual) 502a (C06) and changes to either components are propagated to the other components.

FIG. 5B is a block diagram of an example complementary editor used for language workbench and illustrates how the concept described in FIG. 5A can also be applied to the domain of language workbenches that provide environments to ease development and definition of new computer languages. A computer language can be defined in a Grammar Editor for a given language X while using a textual grammar language Y (for example, Extended Backus-Naur Form (EBNF)). While defining the grammar a visual representation of the grammar is shown as a visual model of an Abstract Syntax Tree (AST) 502b (V-II). The AST 502b can also be modified in the visual AST model view 502b and a change event propagated to the textual Grammar View 504b (V-I) (C01). The grammar language is parsed using parser 505b and propagates parsing information to the Grammar Y parser log 506b. The grammar for language Y can also be used to generate a parser in a Language X runtime binding 508b by using a parser generator 510b (for example, ANTLR). The generated parser can execute directly on Language X code for testing and emitting parsing information to the Grammar Y parser log 506b (C04) and a Language X runtime model (visual) 512b.

Figure 6:
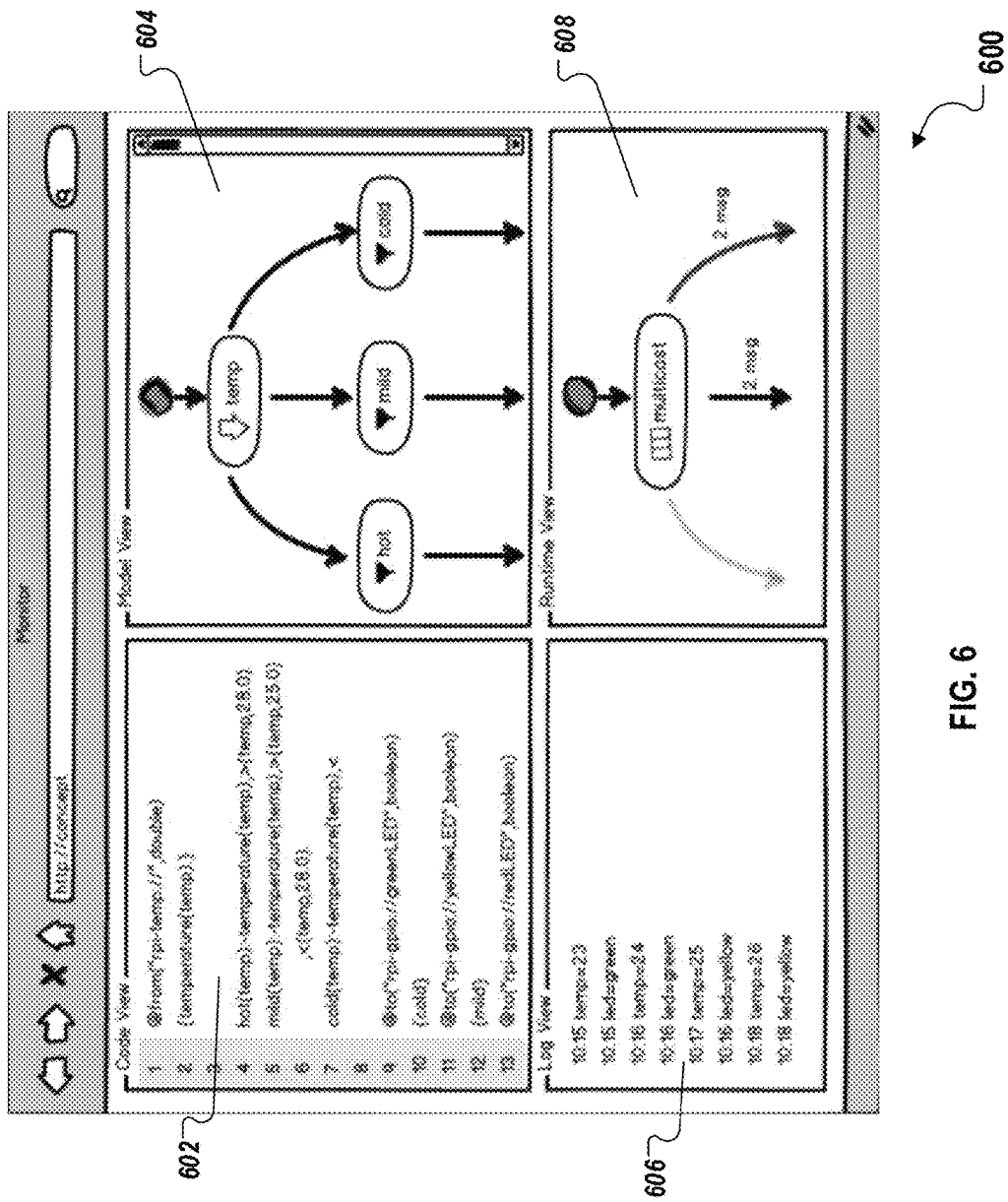
FIG. 6 illustrates a first example flexible monitor, according to an implementation.

FIG. 6 illustrates a first example flexible monitor 600, according to an implementation. In a flexible monitor, editors of different domains can be combined. For example, the flexible monitor 600 combines a code view 602 and a model view 604 with a runtime model view 608 and a log view 606. Notably, the runtime model can differ from a logical model. For instance, FIG. 6 shows content-based message routing based on temperatures a sensor is continuously measuring. The runtime log can be configured to show current events (for example, the temperature) and which LEDs are switched on depending on routing rules. In the runtime the content-based router can be replaced by a multicast with filters. When a temp-value is pass from the sensor, the runtime model shows the route that it takes by weights on the edges in the graph (for example, temperature changed from cold to mild). The same content can be seen in the log in a textual representation. In some cases, the Flurp-minimal editlet in FIG. 4 can also be a flexible monitor.

In some implementations, there can be a reactive editor where change events of linked views lead to an update of a linked or sinked view. There can also be an actual editor where a change event comes from or is delegated to a runtime binding. In some cases, there can be formatted updates where changes of information in a view is constrained. In some cases, the Flurp-minimal editlet in FIG. 4 can also be a reactive, actual, flexible editor.

In some implementations, editor compositions for different domains may require either complete editlets (an editlet combination) or views linked or sinked to other editlets (latter called a view combination in other editors). In some cases, hierarchical editlets (for example, at a meta-model level) can be combined. For example, a Grammar-Text only editlet can be combined with a Code-Model-Log editlet. In this case, if a grammar is changed, the syntax of code can be changed immediately.

Figure 7:
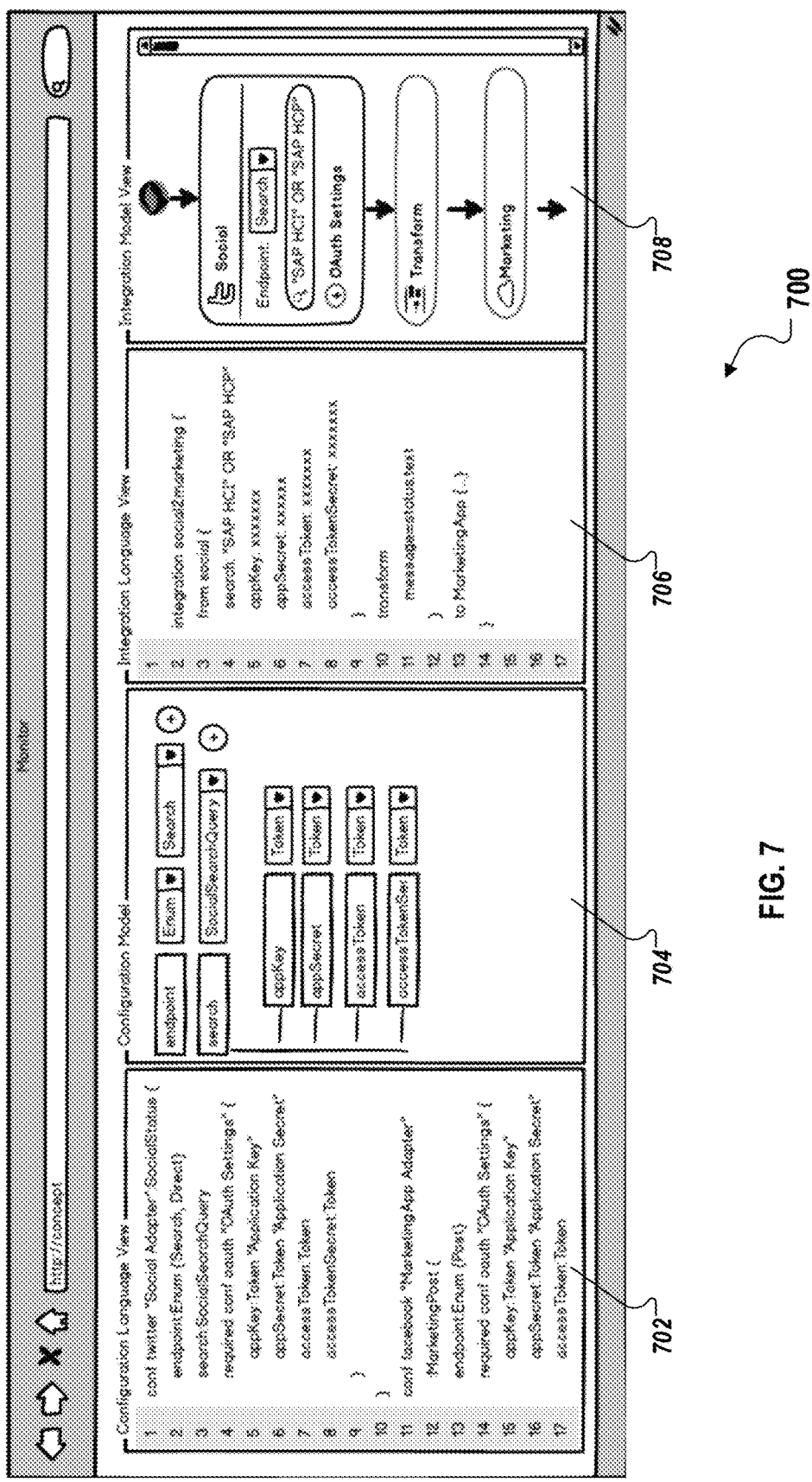
FIG. 7 illustrates a second example flexible monitor, according to an implementation.

FIG. 7 illustrates a second example flexible monitor 700, according to an implementation. The flexible monitor 700 combines editlets of different languages but at the same level, for example, one editlet for configuration language and one for messaging language. The flexible monitor 700 includes a configuration language view 702, a configuration model view 704, an integration language view 706, and an integration model view 708. The flexible monitor 700 shows a form-based graphical model of configuration languages combined with textual and graphical views on an integration scenario description, which allows a user to model and configure an integration scenario at the same time (side-by-side) either textually, graphically, or mixed.

Figure 8:
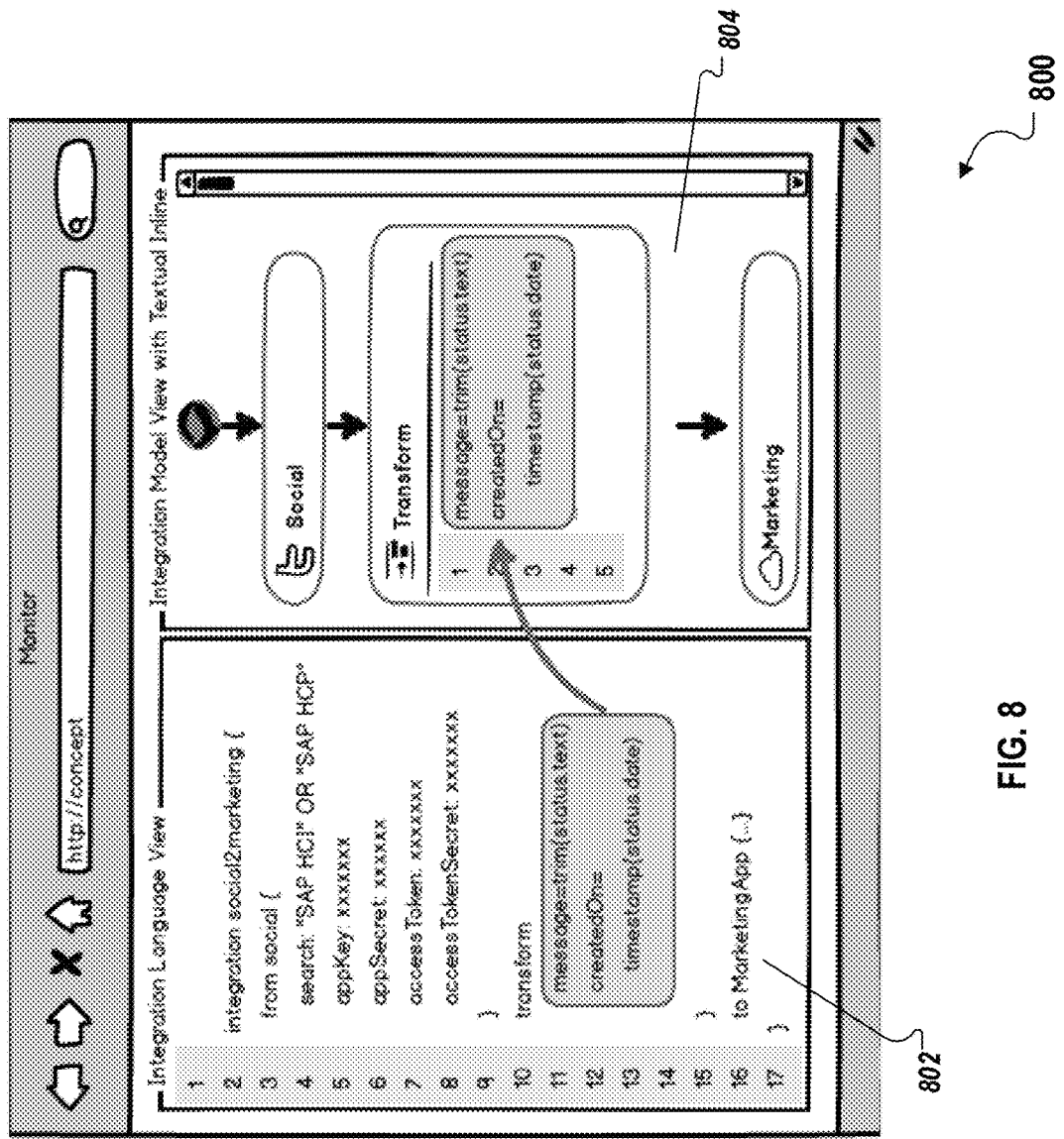
FIG. 8 illustrates a third example flexible monitor, according to an implementation.

FIG. 8 illustrates a third example flexible monitor 800, according to an implementation. The flexible monitor 800 illustrates view inlining where messaging and configuration codes, as well as models of different languages, can be shown in one view (for example, side-by-side or mixed). The illustrated mouse over or mark shows internal information of different languages. The flexible monitor 800 includes an integration language view 802 and an integration model view 804 where a textual view is inlined into a model view, for example, the inlining of transformation code in the integration language view 802 is directly shown in the graphical model 804. This transformation code can be textually changed in the graphical model shown in the integration model view 804. This concept eases the usage of the views, for example, by removing the textual view for a special task and still allowing textual modification of the model/code at the same time.

Figure 9:
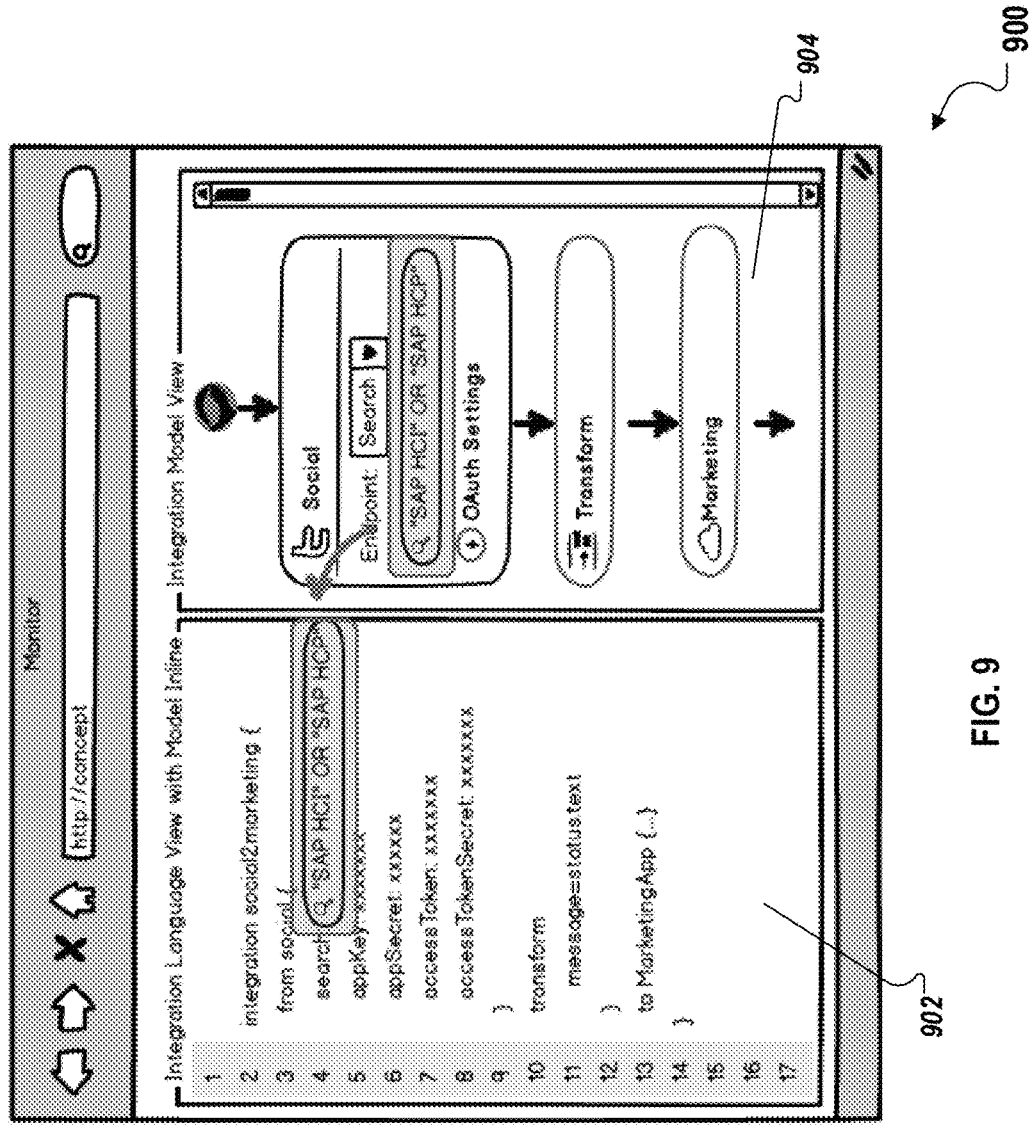
FIG. 9 illustrates a fourth example flexible monitor, according to an implementation.

FIG. 9 illustrates a fourth example flexible monitor 900, according to an implementation. The flexible monitor 900 illustrates the concept of the inlining of a model view with embedded code. Similar to the view inlining discussed above, complete concepts can be inlined. The flexible monitor 900 includes an integration language view 902 and an integration model view 904 where a model view is inlined into a textual view, for example, a form-field for configuration from the model is inlined into the textual view 902, thus leading to a textual view with embedded form-based configuration elements. Hence, within the code, parts of the model are inlined and can be used seamlessly within the textual view.

Figure 10:
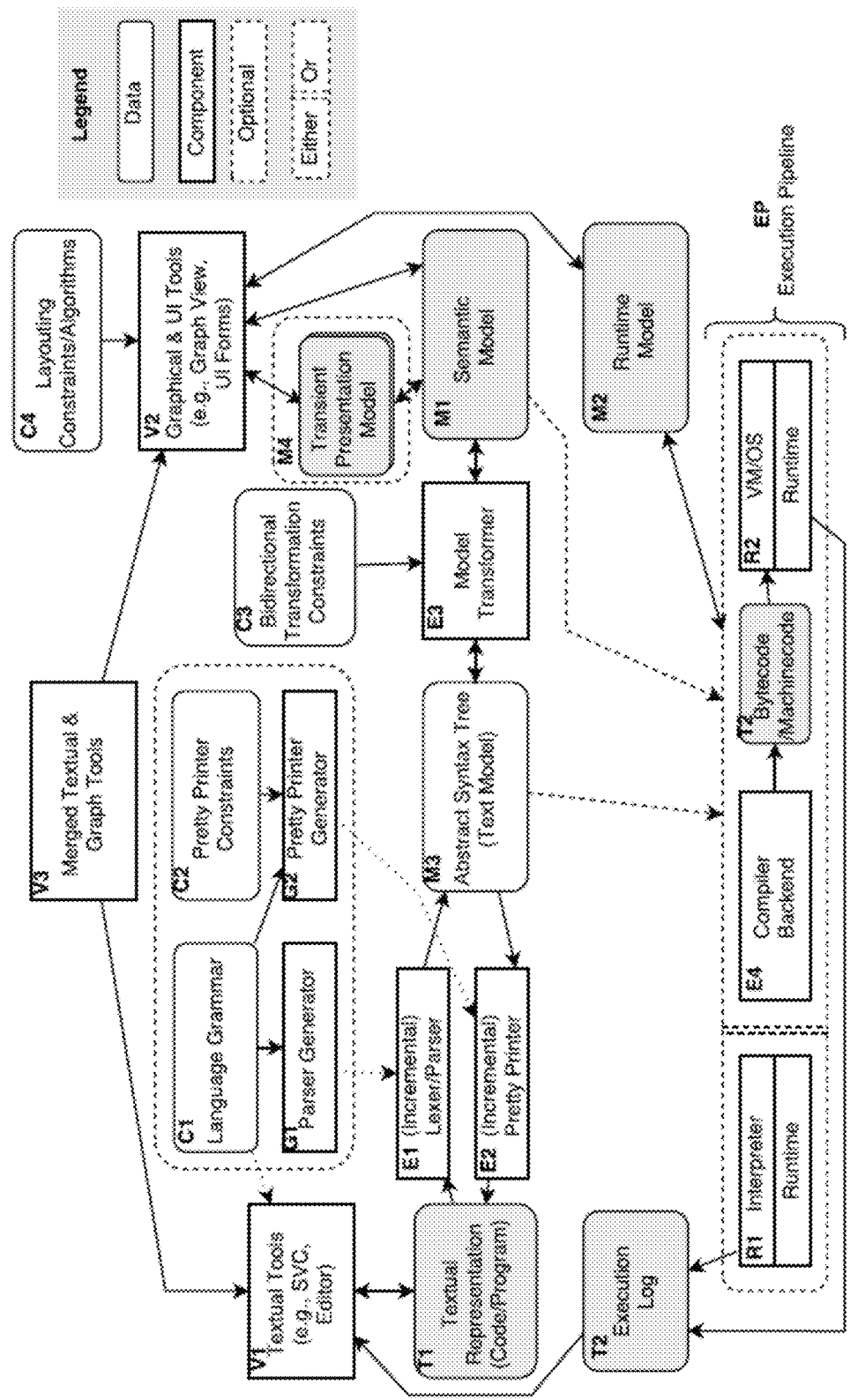
FIG. 10 illustrates a detailed conceptual overview of a complementary programming with associated data and components, according to an implementation.

FIG. 10 illustrates a detailed conceptual overview 1000 of a complementary programming with associated data and components, according to an implementation. As will be discussed below, the components can be categorized by the definitions shown in FIG. 2. The conceptual overview 1000 can include the following components:

A Textual Representation (T1) and a Semantic Model (M1) are two core representations of information from which the execution behavior can be derived and translated into an executable program. These representation can be categorized as Documents (D3).

The Textual Representation (T1) is source code following syntactical rules defined by one or more Language Grammars (C1). T1 may also contain meta-information that is not needed for program execution (for example whitespaces, formatting).

The Semantic Model (M1) is a model that can be derived from an Abstract Syntax Tree (AST) (M2). The Semantic Model does not describe formatting and layouting meta-information, such as coordinates in a canvas or any visual information (colors, shapes, etc.).

T1, M1 or both T1 and M1 can be information-complete, which means that from one representation alone an executable can be derived without the explicit need for existence of the other representation. Preferably, both representations M1 and T1 are information complete, as non-completeness of one model can restrict types of usages in tools working with the representations.

An Execution Pipeline (EP) can execute a program based on the Text Model M3 and/or Semantic Model M1. An Execution Pipeline is restricted to run on an information-complete representation as the source for execution.

Textual Tools (V1) can work with (read/modify) T1. An example of textual tools are text editors (for example vim, emacs, nodepad, sublime text) but also source version control systems (for example svn, git, perforce). Thus, on the textual representation level the legacy of tools for classic programming languages can be used (diff tools etc.). If T1 is not information-complete some textual tools might not be able to be used without harming synchronization (for example replace tools). V1 can be categorized as a View (D4).

A Language Grammar (C1) defines rules (or constraints) how information is syntactically laid out in the text. From a Language Grammar, a Lexer/Parser (E1) can be generated with the help of a Parser Generator (G1). C1 can be categorized as D2.

The Lexer/Parser (E1) extracts information from T1 and transforms it into an AST (M3), which is a model representation of the text derived from the information in the syntactic layout of T1. In this transformation step the formatting/whitespace meta-information may be lost. Actions executed in Textual Tools (V1) may notify the Lexer/Parser (E1) about change events of T1 to trigger partial or full (re-)parsing.

Pretty Printer Constraints (C2) together with C1 describe how the information in M3 can be transformed into auto-formatted source code by adding the necessary meta-information. C2 describes conventional rules in classical languages, for example whitespace formatting, preferred cases for letters (such as CamelCase for class names) and also resolving syntactical ambiguities by defining rules for preferred alternatives. If in the target language x=x+1 is semantically equivalent to x+=1, then one of both syntaxes needs to be defined as the preferred alternative.

Based on C1 and C2, a Pretty Printer Generator (G2) generates a Pretty Printer (E2) which is able to transform M3 into auto-formatted code (T1). By transforming T1 into M3 using E1 and transforming back from M3 to T1 using E2 on every change event in T1, all conventional rules in C2 are enforced in T1 (formatting constraint-enforcement).

With the help of Bidirectional Transformation Constraints (C3) a Model Transformer (E3) can convert a M3 into a Semantic Model (M1) and vice-versa. If the Semantic Model (M1) is not information-complete the Model Transformer (E3) requires that the AST (M3) is constructed first. If in turn T1 is not information-complete, M1 needs to be available (information-complete).

Graphical and UI Tools (V2) visualize/present the Semantic Model by using Layouting Constraints/Algorithms (C4) and allow changes to the model through actions triggered by the User. An example of such tools could be Graph-like Views or UI Forms. There can be multiple graphical views & presentations of the canonical model. V2 can be categorized as a View (D4).

Graphical & UI Tools (V3) can optionally work on intermediate Transient Presentation Models (M4) that are projecting a partial-view on the information in M1 and kept in sync with M1. V3 can be categorized as a View (D4).

The V1 and V2 tools can also be merged/combined together into Merged Textual & Graph Tools (V3), defining a new set of tools optimized to work simultaneously on both core representations T1 and M1, potentially by inlining tools from V1 into V2 and vice-versa.

The Execution Pipeline (EP) can be either a compiler backend and execution pipeline (R2) (including Bytecode/Machinecode (T2) generation) or an interpreter runtime (R1). The EP may also include transient intermediate models/representations for optimization and optimized runtime selections. The runtime can be instrumented to push runtime execution information (categorized by D10) back to the editor tools using a textual Execution Log (T2) or a Runtime Model (M2) (for immediate visualization of execution). The Runtime Model can also be used to modify configuration and execution semantics ad-hoc during runtime from within the graphical tools (V2).

In some implementations, the system described in FIG. 10 can react on changes in the core representations T1 and M1. For example, the following steps can be performed when a user modifies using Textual Tool (V1) and propagate change event to Graphical Tool (V2):

1. A user adds statement to a method in a code to ("social-adapter:test") in V1 on T1. On every keystroke an onChangeEvent is thrown.
2. For every change event E1 is triggered to (incrementally) (re-)parse T1. On syntactical errors an error event is propagated back to V1. On successful parsing of T1 M3 is modified with elements for the "to" statement and the string literal. A M3 modification event is thrown.
3. E2 executes on M3 change events and unparses the to statement with enforced formatting (using C2 constraints) to to ("social-adapter:test"). A change event is triggered to V1.
4. V1 is updated with the auto-formatted statement in T1.
5. E3 reacts on the M3 change event and transforms the changes into M1 model elements for a "social receiver adapter". M1 is changed by executing C3 constraints.
6. V2 tools react on change event in M1 and present new "social receiver adapter" in graph view.
7. M1 is interpreted and executed by R1 on change event of M1.
8. Runtime information during execution is added to T2 and M2 and presented to the user.

As another example, the following steps can be performed when a user modifies using Textual Tool (V1) and propagate change event to Graphical Tool (V2):

1. A user adds a "social receiver adapter" element into the integration graph view in V2.
2. V2 updates the semantic model M1 with the change. A change event is thrown to E3 and R1.
3. M1 is interpreted and executed by R1 on change event.
4. Runtime information during execution is added to T2 and M2 and presented to the user.
5. E3 transforms model change in M1 to a to ("social-adapter:test") textual model in M3.
6. E2 reacts on change in M3 and unparses changed element in M3 and modifies T1. Change event is thrown to V1.
7. V1 updates view on T1 and presents added statement to ("social-adapter:test") in the code.

Figure 11:
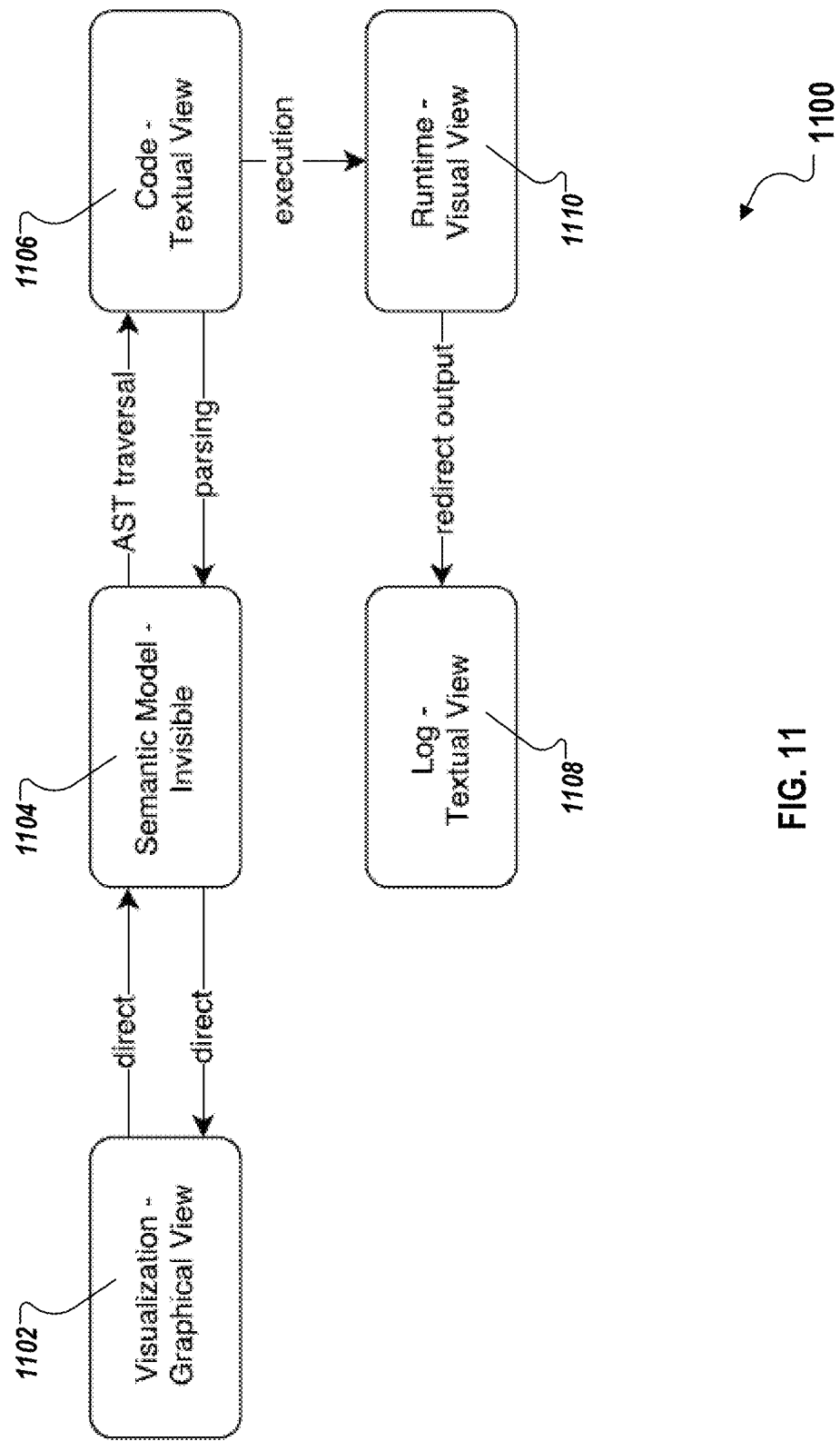
FIG. 11 illustrates views for Flurp, according to an implementation.

FIG. 11 illustrates views 1100 for Flurp, according to an implementation. FIG. 11 shows the following views for Flurp: T1 for source code 1106, M1 for model 1102, M2 for runtime model 1110, and T2 for runtime log 1108, which are linked and sinked as shown in the figure. The reactiveness characteristic is defined between the visual and textual representations of the model, for example, enforced through a semantic model 1104 (not visible). The runtime model visualization as well as the runtime log are only set unidirectional in this example. Setting them as "bi-directionally synchronized link" means that ad-hoc change in the runtime would immediately be reflected in the model and textual views.

Figure 12:
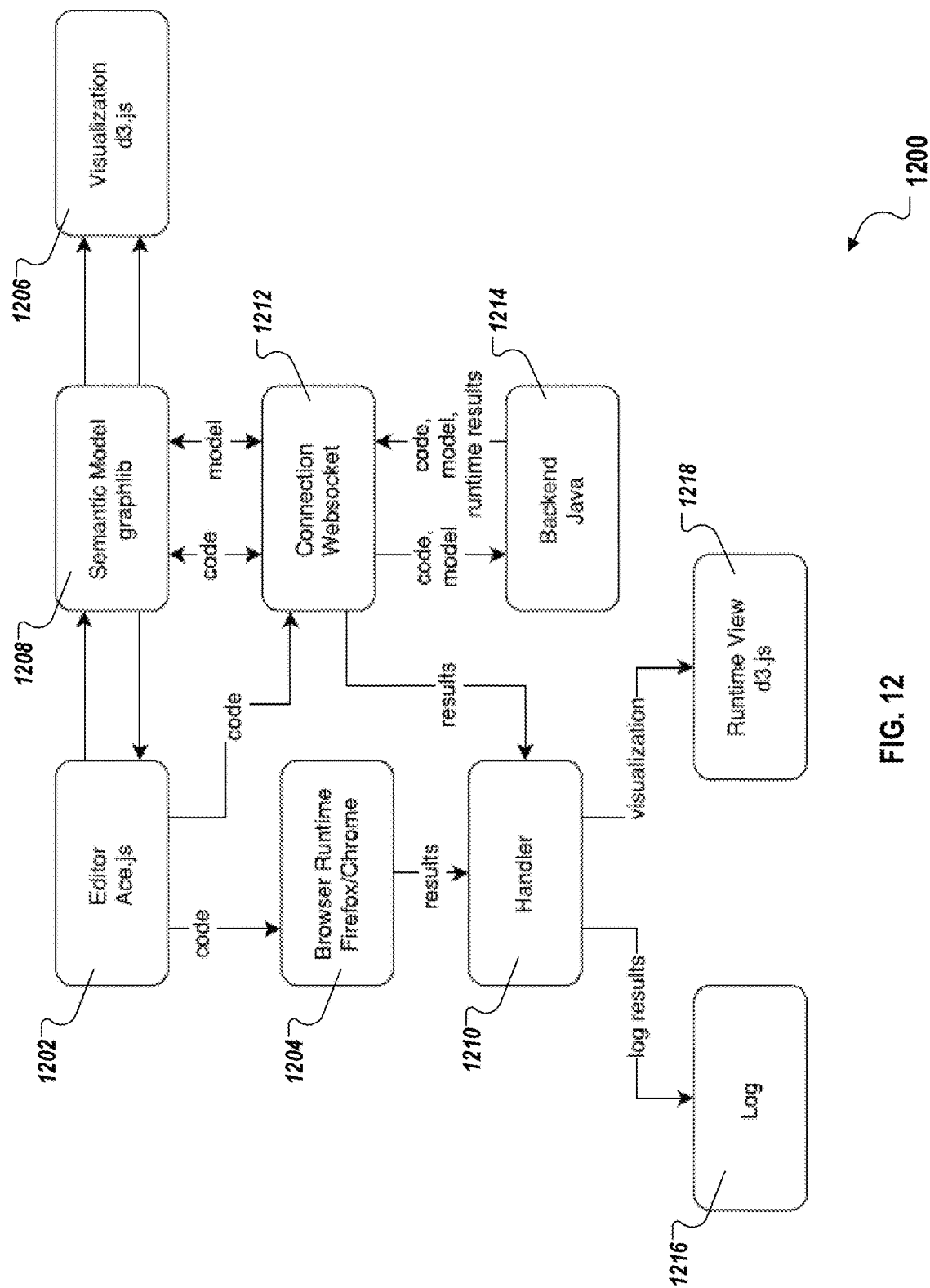
FIG. 12 illustrates a concrete realization of a flexible monitor for Flurp, according to an implementation.

FIG. 12 illustrates a concrete realization of a flexible monitor 1200 for Flurp, according to an implementation. As shown in the figure, a connection to the backend (runtime bindings) can be handled using a semantic model, which uses (parser) handlers to visualize runtime-related views (for example, only showing an AST. The runtime view can be any graphical model that allows an insight into the domain (for example, a call graph of the current program). This can be complemented by a runtime log, which shows a textual representation of events that occurred during the execution.

In the illustrated example, the textual view/editor implementation 1202 uses a Java Script library (for example, Ace.js), whose code is executed in a browser runtime 1204 (for example, FIREFOX, CHROME, SAFARI, INTERNET EXPLORER, etc.). A graphical model is visualized using a JAVASCRIPT library 1206 (for example, d3.js). This is bridged by a semantic model intermediator 1208 that ensures the bi-directional mapping using a graph library (for example, graphlib). Changes in the textual editor 1202 lead to: (a) events to a handler 1210 that updates the related views (for example, user interface (UI)) and (b) sends code/model using a bi-directional connection 1212 (for example, a WebSocket) to a backend 1214 (for example, in this case JAVA). The backend 1214 executes code/model and returns code, model, and runtime results using the bi-directional connection 1212 to a correct UI instance. These results are forwarded to the handler 1210, which displays the runtime results as log 1216, and the model as runtime view 1218 (for example, using d3.js). Code or model changes in the backend 1214 (from runtime) might be passed to the semantic model 1208, which then decides on updating the textual editor 1202 and the visualization/graphical model. In this way, code changes can impact current modeling and textual representations.

Figure 13:
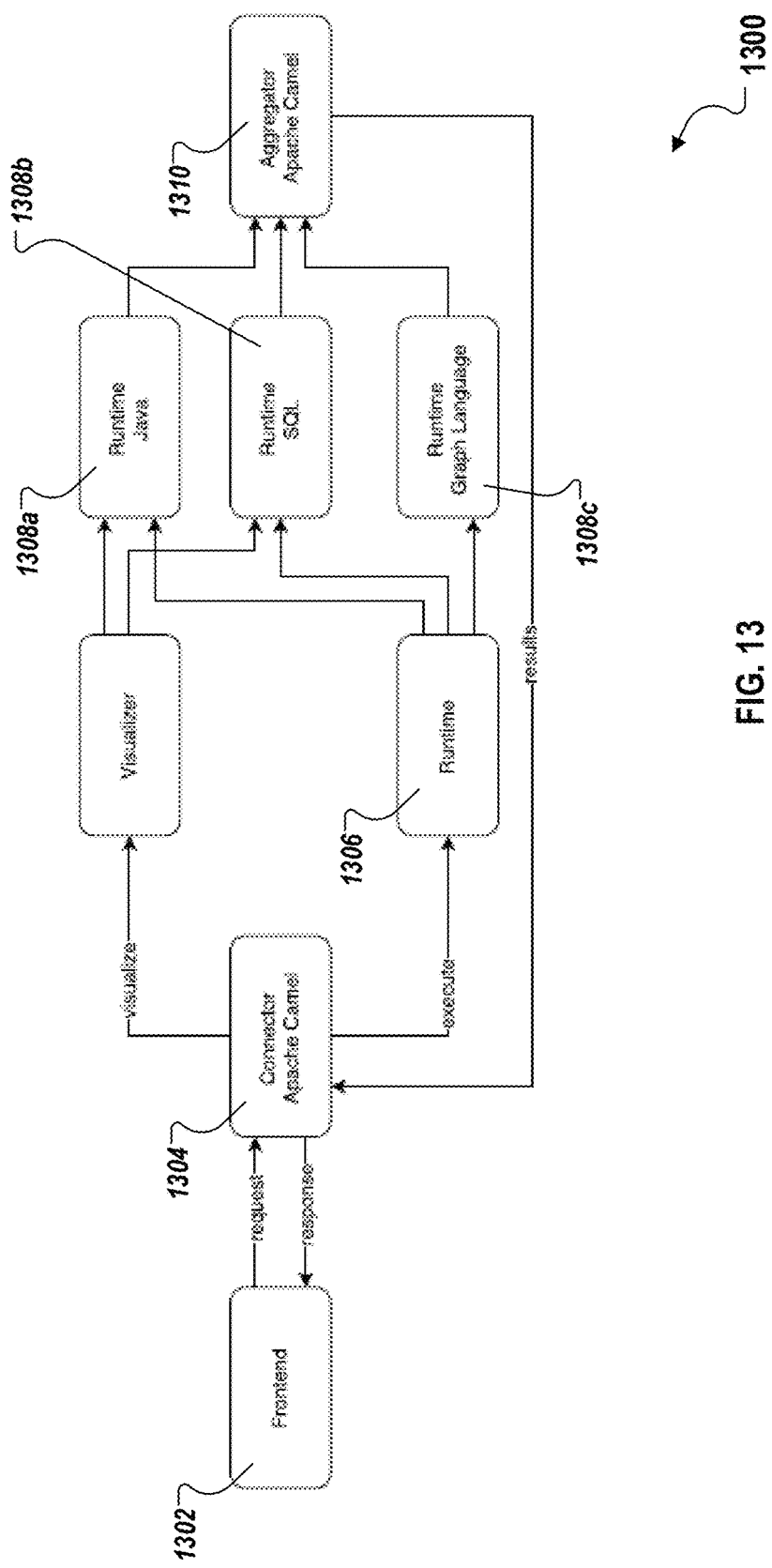
FIG. 13 illustrates a realization of backend services for Flurp, according to an implementation.

FIG. 13 illustrates a realization of backend services 1300 for Flurp, according to an implementation. Code execution is either performed directly in the browser (if the browser supports the language, for example, JavaScript) or sent to the backend. In both cases, output is captured and displayed in the text log or in the runtime view. When a connector receives a message, it determines what to do with it, for example, determining the input language of the message and whether to execute or display the message. The message then invokes the language runtime for the code and runs it. Output is redirected to an aggregator, which sends it back to the web application. In the illustrated implementation, a frontend 1302 is abstracted and sends requests and receives responses using a bi-directional connection (for example, see FIG. 12, element 1212). The focus lies on the backend, which more concretely implements a connector 1304 (for example, using Apache Camel) to establish the bi-directional connection. Code/model received from a UI is executed by the runtime 1306, which can include a multitude of possible runtime systems (for example, JAVA 1308*a*, SQL for Databases 1308*b*, and APACHE CAMEL for runtime graph language 1308*c*, etc.). The runtime model and log results are then aggregated by an aggregator 1310 (for example, implemented in APACHE CAMEL) and forwarded to the frontend 1302 using the bi-directional connection 1304. Data received from the frontend 1302 (for example, code or model) can be visualized in a view in the backend and potentially modified before executing.

Figure 14:
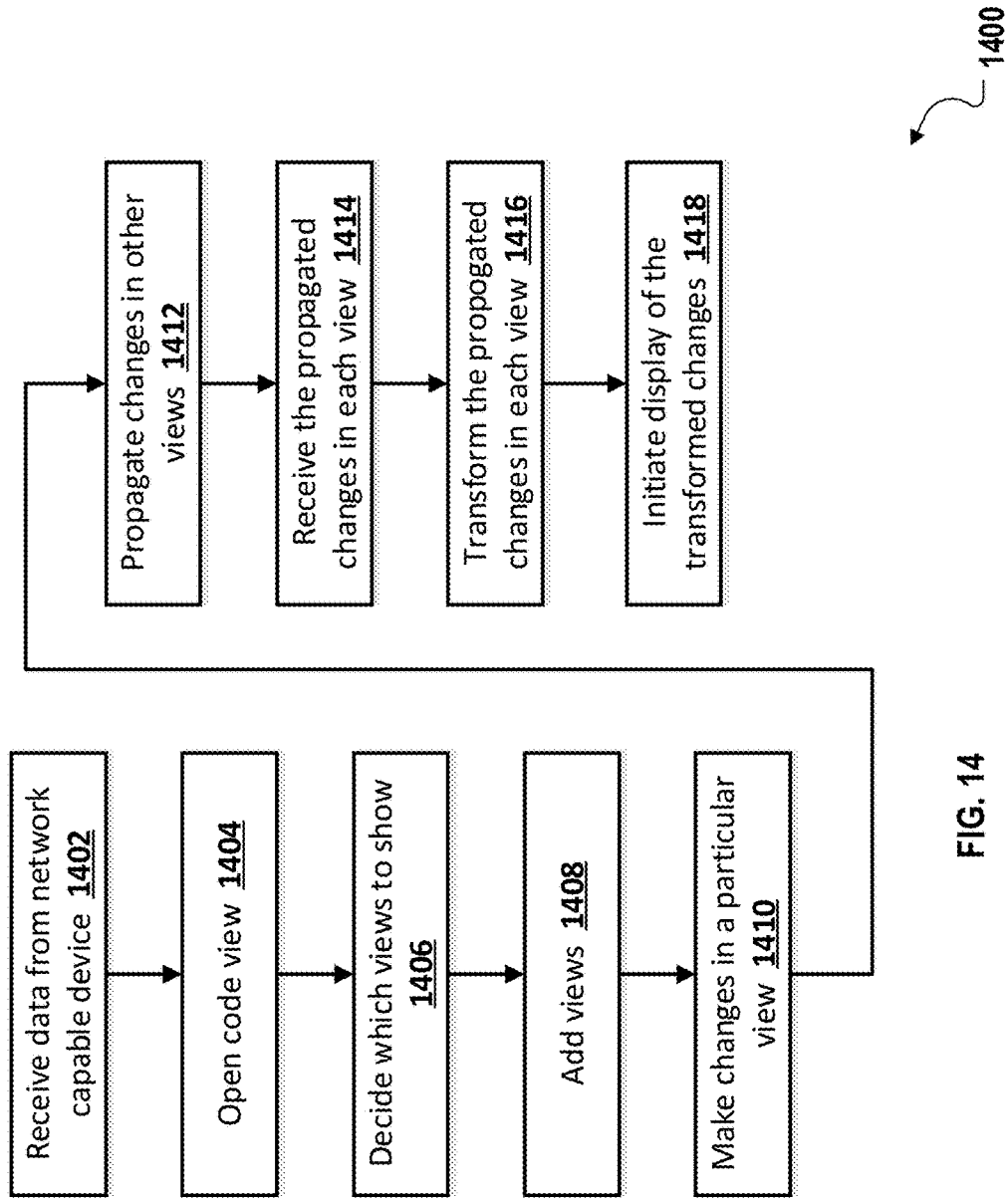
FIG. 14 is a flowchart of an example method for complementary model-driven and textual development using enforced formatting constraints, according to an implementation.

FIG. 14 is a flowchart of an example method 1400 for complementary model-driven and textual development using enforced formatting constraints, according to an implementation. For clarity of presentation, the description that follows generally describes method 1400 in the context of the other figures in this description. However, it will be understood that method 1400 may be performed, for example, by any suitable system, environment, software, and hardware, or a combination of systems, environments, software, and hardware as appropriate. In some implementations, various steps of method 1400 can be run in parallel, in combination, in loops, or in any order.

At 1402, a complementary editor receives data from a network-capable device, for example, an IoT device collecting temperature data as in the example of FIG. 4. From 1402, method 1400 proceeds to 1404.

At 1404, the complementary editor opens a code view showing textual source codes. From 1404, method 1400 proceeds to 1406.

At 1406, the complementary editor decides which other views to show. For example, as shown in FIG. 6, besides a code view, the complementary editor can also include a model view showing a visual graphical model, a log view showing log data at runtime, and a runtime view. From 1406, method 1400 proceeds to 1408.

At 1408, the complementary editor adds views determined at 1406. From 1408, method 1400 proceeds to 1410.

At 1410, changes are made in a particular view of the complementary editor. From 1410, method 1400 proceeds to 1412.

At 1412, the changes made in the particular view are propagated to other affected views in the complementary editor. For example, as shown in FIG. 8, any code change made in the integration model view will immediately change the code in the integration language code view. Similarly, in FIG. 6, any code change made in the code view will immediately affect the log view such that the runtime log data shown in the log view are based on the updated code. From 1412, method 1400 proceeds to 1414.

At 1414, propagated changes are received in each particular view of the other views. In some implementations, formatting constraints are enforced prior to propagating changes to other views—in other words the received propagated changes are formatted and can be displayed in an appropriate view. The formatting constraints may include textual constraints and model constraints as discussed above. In this case, method 1400 proceeds to 1418. In other implementations, method 1400 proceeds to 1416.

At 1416, the received propagated changes are transformed in each of the other views using the above-described formatting constraints. From 1416 method 1400 proceeds to 1418.

At 1418, the transformed propagated changes are initiated for display in each of the other views to reflect the changes made in 1410. After 1418, method 1400 stops.

Note that the provided method 1400 is just one possible example. In other implementations, method 1400 can be started at other views in the flow. For example, using data received from a device, directly with a model/graphical view, in a textual mode view, etc. As another example, referring to back to FIG. 11, a user can work in the code-textual view 1106 which will affect the runtime visual view 1110, semantic model-invisible view 1104 and the visualization-graphical view 1102. Similar is true if say the user is working in the visualization-graphical view 1102. As previously explained, method 1400 allows changing of views instantly, and change on view can be immediately propagated to all other affected views. In some implementations, changes can be propagated to data supporting views that are not yet opened so that opening the affected view presents in immediately updated view for the user. As will be understandable to those of ordinary skill in the art, the illustrated flow for method 1400 can take many forms consistent with this disclosure. These other forms are considered to be within the scope of this disclosure.

Figure 15:
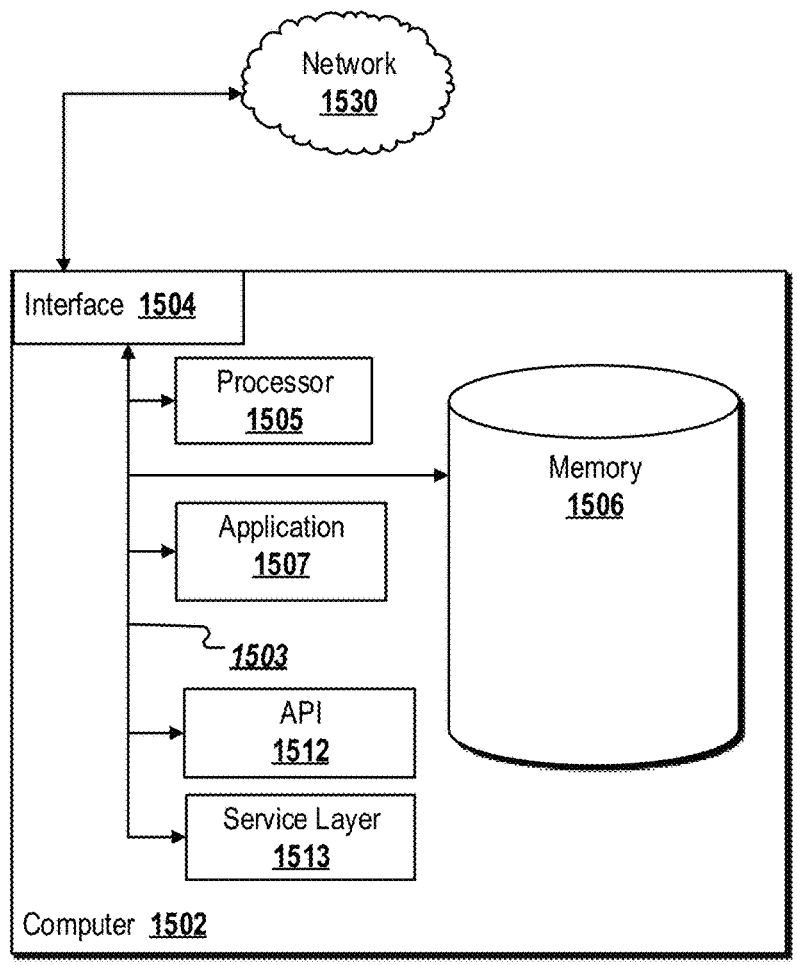
FIG. 15 is a block diagram of an exemplary computer system used to provide computational functionalities associated with described algorithms, methods, functions, processes, flows, and procedures as described in the instant disclosure, according to an implementation.

FIG. 15 is a block diagram of an exemplary computer system 1500 used to provide computational functionalities associated with described algorithms, methods, functions, processes, flows, and procedures as described in the instant disclosure, according to an implementation. The illustrated computer 1502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1502 may comprise a computer that includes an input device, such as a keypad, keyboard, touch screen, or other device that can accept user information, and an output device that conveys information associated with the operation of the computer 1502, including digital data, visual, or audio information (or a combination of information), or a GUI.

The computer 1502 can serve in a role as a client, network component, a server, a database or other persistency, or any other component (or a combination of roles) of a computer system for performing the subject matter described in the instant disclosure. The illustrated computer 1502 is communicably coupled with a network 1530. In some implementations, one or more components of the computer 1502 may be configured to operate within environments, including cloud-computing-based, local, global, or other environment (or a combination of environments).

At a high level, the computer 1502 is an electronic computing device operable to receive, transmit, process, store, or manage data and information associated with the described subject matter. According to some implementations, the computer 1502 may also include or be communicably coupled with an application server, e-mail server, web server, caching server, streaming data server, business intelligence (BI) server, or other server (or a combination of servers).

The computer 1502 can receive requests over network 1530 from a client application (for example, executing on another computer 1502) and respond to the received requests by processing the said requests in an appropriate software application. In addition, requests may also be sent to the computer 1502 from internal users (for example, from a command console or by other appropriate access method), external or third-parties, other automated applications, as well as any other appropriate entities, individuals, systems, or computers.

Each of the components of the computer 1502 can communicate using a system bus 1503. In some implementations, any or all of the components of the computer 1502, both hardware or software (or a combination of hardware and software), may interface with each other or the interface 1504 (or a combination of both) over the system bus 1503, using an application programming interface (API) 1512 or a service layer 1513 (or a combination of the API 1512 and service layer 1513). The API 1512 may include specifications for routines, data structures, and object classes. The API 1512 may be either computer-language independent or dependent and refer to a complete interface, a single function, or even a set of APIs. The service layer 1513 provides software services to the computer 1502 or other components (whether or not illustrated) that are communicably coupled to the computer 1502. The functionality of the computer 1502 may be accessible for all service consumers using this service layer. Software services, such as those provided by the service layer 1513, provide reusable, defined business functionalities through a defined interface. For example, the interface may be software written in JAVA, C++, or other suitable language providing data in extensible markup language (XML) format or other suitable format. While illustrated as an integrated component of the computer 1502, alternative implementations may illustrate the API 1512 or the service layer 1513 as stand-alone components in relation to other components of the computer 1502 or other components (whether or not illustrated) that are communicably coupled to the computer 1502. Moreover, any or all parts of the API 1512 or the service layer 1513 may be implemented as child or sub-modules of another software module, enterprise application, or hardware module without departing from the scope of this disclosure.

The computer 1502 includes an interface 1504. Although illustrated as a single interface 1504 in FIG. 15, two or more interfaces 1504 may be used according to particular needs, desires, or particular implementations of the computer 1502. The interface 1504 is used by the computer 1502 for communicating with other systems in a distributed environment, that are connected to the network 1530 (whether illustrated or not). Generally, the interface 1504 comprises logic encoded in software or hardware (or a combination of software and hardware) and operable to communicate with the network 1530. More specifically, the interface 1504 may comprise software supporting one or more communication protocols associated with communications such that the network 1530 or interface's hardware is operable to communicate physical signals within and outside of the illustrated computer 1502.

The computer 1502 includes a processor 1505. Although illustrated as a single processor 1505 in FIG. 15, two or more processors may be used according to particular needs, desires, or particular implementations of the computer 1502. Generally, the processor 1505 executes instructions and manipulates data to perform the operations of the computer 1502 and any algorithms, methods, functions, processes, flows, and procedures as described in the instant disclosure.

The computer 1502 also includes a memory 1506 that holds data for the computer 1502 or other components (or a combination of both) that can be connected to the network 1530 (whether illustrated or not). For example, memory 1506 can be a database storing data consistent with this disclosure. Although illustrated as a single memory 1506 in FIG. 15, two or more memories may be used according to particular needs, desires, or particular implementations of the computer 1502 and the described functionality. While memory 1506 is illustrated as an integral component of the computer 1502, in alternative implementations, memory 1506 can be external to the computer 1502.

The application 1507 is an algorithmic software engine providing functionality according to particular needs, desires, or particular implementations of the computer 1502, particularly with respect to functionality described in this disclosure. For example, application 1507 can serve as one or more components, modules, applications, etc. Further, although illustrated as a single application 1507, the application 1507 may be implemented as multiple applications 1507 on the computer 1502. In addition, although illustrated as integral to the computer 1502, in alternative implementations, the application 1507 can be external to the computer 1502.

There may be any number of computers 1502 associated with, or external to, a computer system containing computer 1502, each computer 1502 communicating over network 1530. Further, the term "client," "user," and other appropriate terminology may be used interchangeably, as appropriate, without departing from the scope of this disclosure. Moreover, this disclosure contemplates that many users may use one computer 1502, or that one user may use multiple computers 1502.

Described implementations of the subject matter can include one or more features, alone or in combination.

For example, in a first implementation, a computer-implemented method includes opening, by a complementary editor, a plurality of views; receiving changes in a particular view of the plurality of views; propagating the received changes to other views of the plurality of views other than the particular view; receiving the propagated changes in each particular view of the other views; transforming by a computer, the propagated changes in each particular view based on formatting constraints associated with each particular view; and initiating display of the transformed propagated changes in each particular view.

The foregoing and other described implementations can each optionally include one or more of the following features:

A first feature, combinable with any of the following features, further comprising: receiving data from a network-capable device; opening a code view; determining other views of the plurality of views other than the code view to open; and opening the other views in the complementary editor.

A second feature, combinable with any of the previous or following features, wherein the formatting constraints include textual constraints and model constraints.

A third feature, combinable with any of the previous or following features, wherein the plurality of views include at least a code view, a graphical model view, and a log view, and the method further comprises: updating software code in the code view; updating a model in the graphical model view, and displaying runtime log data in the log view based on the updated software code.

A fourth feature, combinable with any of the previous or following features, wherein the plurality of views include at least a code view and a model view, and the method further comprising: inlining software code from the code view into the model view; embedding executable runtime code into other views; changing the inlined software code in the model view; and updating corresponding software code in the code view based on the changed inlined code in the model view A fifth feature, combinable with any of the previous or following features, wherein the complementary editor includes a textual representation and a semantic model.

A sixth feature, combinable with any of the previous or following features, wherein at least one of the textual representation and a semantic model includes complete information to derive an executable program.

In a second implementation, non-transitory, computer-readable medium storing one or more instructions executable by a computer system to perform operations comprising: opening, by a complementary editor, a plurality of views; receiving changes in a particular view of the plurality of views; propagating the received changes to other views of the plurality of views other than the particular view; receiving the propagated changes in each particular view of the other views; transforming the propagated changes in each particular view based on formatting constraints associated with each particular view; and initiating display of the transformed propagated changes in each particular view.

The foregoing and other described implementations can each optionally include one or more of the following features:

A first feature, combinable with any of the following features, further comprising: receiving data from a network-capable device; opening a code view; determining other views of the plurality of views other than the code view to open; and opening the other views in the complementary editor.

A second feature, combinable with any of the previous or following features, wherein the formatting constraints include textual constraints and model constraints.

A third feature, combinable with any of the previous or following features, wherein the plurality of views include at least a code view, a graphical model view, and a log view, and the method further comprises: updating software code in the code view; updating a model in the graphical model view, and displaying runtime log data in the log view based on the updated software code.

A fourth feature, combinable with any of the previous or following features, wherein the plurality of views include at least a code view and a model view, and the method further comprising: inlining software code from the code view into the model view; embedding executable runtime code into other views; changing the inlined software code in the model view; and updating corresponding software code in the code view based on the changed inlined code in the model view.

A fifth feature, combinable with any of the previous or following features, wherein the complementary editor includes a textual representation and a semantic model.

A sixth feature, combinable with any of the previous or following features, wherein at least one of the textual representation and a semantic model includes complete information to derive an executable program.

In a third implementation, a computer system comprises: a computer memory; and a hardware processor interoperably coupled with the computer memory and configured to perform operations comprising: opening, by a complementary editor, a plurality of views; receiving changes in a particular view of the plurality of views; propagating the received changes to other views of the plurality of views other than the particular view; receiving the propagated changes in each particular view of the other views; transforming the propagated changes in each particular view based on formatting constraints associated with each particular view; and initiating display of the transformed propagated changes in each particular view.

The foregoing and other described implementations can each optionally include one or more of the following features:

A first feature, combinable with any of the following features, further configured to perform operations comprising: receiving data from a network-capable device; opening a code view; determining other views of the plurality of views other than the code view to open; and opening the other views in the complementary editor.

A second feature, combinable with any of the previous or following features, wherein the formatting constraints include textual constraints and model constraints.

A third feature, combinable with any of the previous or following features, wherein the plurality of views include at least a code view, a graphical model view, and a log view, and the method further comprises: updating software code in the code view; updating a model in the graphical model view, and displaying runtime log data in the log view based on the updated software code.

A fourth feature, combinable with any of the previous or following features, wherein the plurality of views include at least a code view and a model view, and the method further comprising: inlining software code from the code view into the model view; embedding executable runtime code into other views; changing the inlined software code in the model view; and updating corresponding software code in the code view based on the changed inlined code in the model view.

A fifth feature, combinable with any of the previous or following features, wherein the complementary editor includes a textual representation and a semantic model, and wherein at least one of the textual representation and a semantic model includes complete information to derive an executable program.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural, to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims, as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
opening, by a complementary editor executed by at least one processor, a plurality of views for concurrent presentation, each view associated with a piece of software, wherein each view is associated with a semantic model associating a textual representation of the software and a graphical model of the software, the complementary editor managing bi-directional communications for automatic synchronization between a particular view and each of the other views of the plurality of views;
receiving, by the complementary editor, changes in a particular view of the plurality of views via a graphical user interface, wherein the received changes include updating software code in a code view;
propagating the received changes, via the bi-directional communication, to other views of the plurality of views other than the particular view;
receiving the propagated changes in each of the other views of the plurality of views other than the particular view, wherein in response to the updated software code in the code view, a model in a graphical model view is updated;
transforming, by a computer executed by the at least one processor, the propagated changes in each of the other views in the plurality of views based on formatting constraints specifically associated with each of the other views; and
initiating display of the transformed propagated changes in each of the other views of the plurality of views, wherein the display includes a display of runtime log data in a log view based on the received changes to the updated software code.

2. The computer-implemented method of claim 1, further comprising:
receiving data from a network-capable device;
opening a code view;
determining other views of the plurality of views other than the code view to open; and
opening the other views in the complementary editor.

3. The computer-implemented method of claim 1, wherein the formatting constraints include textual constraints and model constraints.

4. The computer-implemented method of claim 1, wherein the plurality of views include at least a code view and a model view, and the method further comprising:
inlining software code from the code view into the model view;
embedding executable runtime code into at least one other view;
changing the inlined software code in the model view; and
updating corresponding software code in the code view based on the changed inlined code in the model view.

5. The computer-implemented method of claim 1, wherein the complementary editor includes views associated with at least one of a textual representation and a graphical model of the software.

6. The computer-implemented method of claim 5, wherein at least one of the textual representation and a graphical model includes complete information to derive an executable program.

7. A non-transitory, computer-readable medium storing one or more instructions executable by a computer system to perform operations comprising:
opening, by a complementary editor executed by at least one processor, a plurality of views for concurrent presentation, each view associated with a piece of software, wherein each view is associated with a semantic model and a textual representation managing bi-directional communications for automatic synchronization between a particular view and each of the other views of the plurality of views;
receiving changes in a particular view of the plurality of views via a graphical user interface, wherein the received changes include updating software code in a code view;
propagating the received changes, via the bi-directional communication, to other views of the plurality of views other than the particular view;
receiving the propagated changes in each of the other views of the plurality of views other than the particular view, wherein in response to the updated software code in the code view, a model in a graphical model view is updated;
transforming the propagated changes in each of the other views in the plurality of views based on formatting constraints specifically associated with each of the other views; and
initiating display of the transformed propagated changes in each of the other views of the plurality of views, wherein the display includes a display of runtime log data in a log view based on the received changes to the updated software code.

8. The non-transitory, computer-readable medium of claim 7, further comprising:
receiving data from a network-capable device;
opening a code view;
determining other views of the plurality of views other than the code view to open; and
opening the other views in the complementary editor.

9. The non-transitory, computer-readable medium of claim 7, wherein the formatting constraints include textual constraints and model constraints.

10. The non-transitory, computer-readable medium of claim 7, wherein the plurality of views include at least a code view and a model view, and the method further comprising:
inlining software code from the code view into the model view;
embedding executable runtime code into at least one other view;
changing the inlined software code in the model view; and
updating corresponding software code in the code view based on the changed inlined code in the model view.

11. The non-transitory, computer-readable medium of claim 7, wherein the complementary editor includes views associated with at least one of a textual representation and a graphical model of the software.

12. The non-transitory, computer-readable medium of claim 11, wherein at least one of the textual representation and a graphical model includes complete information to derive an executable program.

13. A computer system, comprising:
a computer memory; and
a hardware processor interoperably coupled with the computer memory and configured to perform operations comprising:
opening, by a complementary editor executed by at least one processor, a plurality of views for concurrent presentation, each view associated with a piece of software, wherein each view is associated with a semantic model and a textual representation managing bi-directional communications for automatic synchronization between a particular view and each of the other views of the plurality of views;
receiving changes in a particular view of the plurality of views via a graphical user interface, wherein the received changes include updating software code in a code view;
propagating the received changes, via the bi-directional communication, to other views of the plurality of views other than the particular view;
receiving the propagated changes in each of the other views of the plurality of views other than the particular view, wherein in response to the updated software code in the code view, a model in a graphical model view is updated;
transforming the propagated changes in each of the other views in the plurality of views based on formatting constraints specifically associated with each of the other views; and
initiating display of the transformed propagated changes in each of the other views of the plurality of views, wherein the display includes a display of runtime log data in a log view based on the received changes to the updated software code.

14. The computer system of claim 13, further configured to perform operations comprising:
receiving data from a network-capable device;
opening a code view;
determining other views of the plurality of views other than the code view to open; and
opening the other views in the complementary editor.

15. The computer system of claim 13, wherein the formatting constraints include textual constraints and model constraints.

16. The computer system of claim 13, wherein the plurality of views include at least a code view and a model view, and the method further comprising:
  inlining software code from the code view into the model view;
  embedding executable runtime code into at least one other view;
  changing the inlined software code in the model view; and
  updating corresponding software code in the code view based on the changed inlined code in the model view.

17. The computer system of claim 13, wherein the complementary editor includes views associated with at least one of a textual representation and a graphical model of the software, and wherein at least one of the textual representation and the graphical model includes complete information to derive an executable program.

* * * * *